United States Patent [19]

Okuno et al.

[11] Patent Number: 4,867,641
[45] Date of Patent: Sep. 19, 1989

[54] OUTER WALL STRUCTURE OF A TORQUE CONVERTER AND OTHERS

[75] Inventors: Yoshihiro Okuno; Jun Sakanoue, both of Ueno; Yoshitsugu Sakamoto, Nabari; Tsugio Hatanaka, Ueno; Takashi Okuno, Neyagawa, all of Japan

[73] Assignee: Kabushiki Kaisha Daikin Seisakusho, Osaka, Japan

[21] Appl. No.: 184,632

[22] PCT Filed: Sep. 9, 1987

[86] PCT No.: PCT/JP87/00669
§ 371 Date: Mar. 15, 1988
§ 102(e) Date: Mar. 15, 1988

[87] PCT Pub. No.: WO88/02080
PCT Pub. Date: Mar. 24, 1988

[30] Foreign Application Priority Data

Sep. 12, 1986 [JP] Japan ................... 61-140980
Oct. 9, 1986 [JP] Japan ................... 61-155102

[51] Int. Cl.⁴ ............................................. F01D 25/24
[52] U.S. Cl. ...................... 415/215.1; 60/364; 219/137 R
[58] Field of Search ............... 60/364, 365, 366, 367, 60/330; 415/219 R, 219 C, 215.1; 219/137 R

[56] References Cited

U.S. PATENT DOCUMENTS

| | | |
|---|---|---|
| 1,485,555 | 3/1924 | Daykin ............... 219/137 R X |
| 2,324,928 | 7/1943 | Hill ................... 219/137 R X |
| 3,003,601 | 10/1961 | Ott .................... 219/137 R X |
| 3,183,066 | 5/1965 | Lessmann et al. .... 219/137 R X |
| 3,852,955 | 12/1974 | Wonn et al. .......... 60/364 X |
| 4,009,570 | 3/1977 | Ohkuoo et al. ........ 60/367 X |
| 4,383,799 | 5/1983 | Okano et al. .......... 415/219 C |

FOREIGN PATENT DOCUMENTS 59-186977 12/1984 Japan .

Primary Examiner—Edward K. Look
Attorney, Agent, or Firm—Armstrong, Nikaido Marmelstein Kubovcik & Murray

[57] ABSTRACT

An outer wall structure of a torque converter or the like including an input housing (1) having an end portion (2), and a pump impeller shell 4 having an end portion (5) fixed to the end portion of the input housing (1). one (5) of the end portions (2, 5) is provided at the outer peripheral surface with a surface portion (15) of a relatively small diameter and a surface portion (16) of a relatively large diameter. A space (27) for accumulating spatter therein is formed between an inner peripheral surface (20) of the other end portion (2) and the surface portion (15) of the relative small diameter.

3 Claims, 1 Drawing Sheet

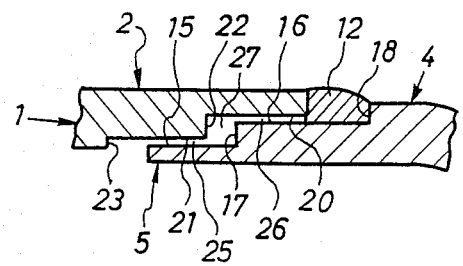
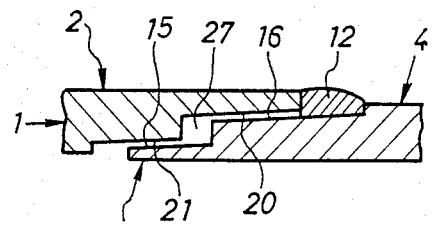
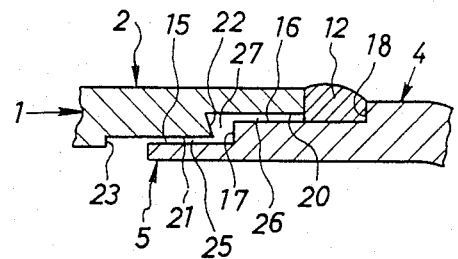
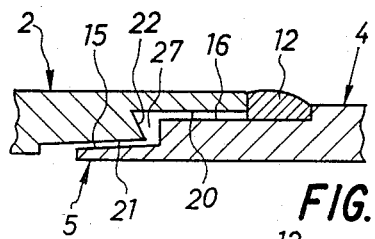
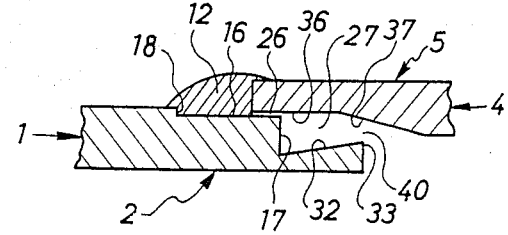
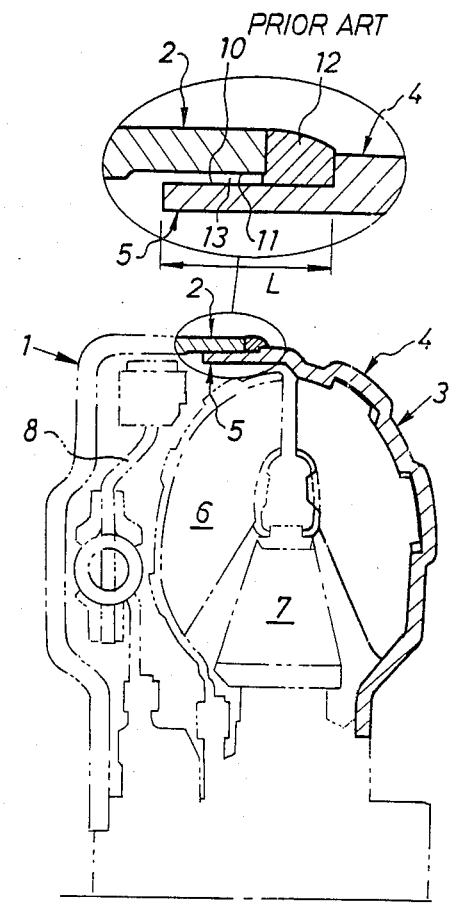
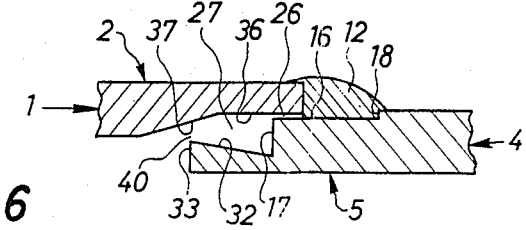

OUTER WALL STRUCTURE OF A TORQUE CONVERTER AND OTHERS

FIELD OF THE INVENTION

The present invention relates to an outer wall structure formed by an input housing (front cover) and a pump shell (impeller shell) fixed to the housing in torque converters and other fluid couplings.

BACKGROUND OF THE INVENTION

Referring to FIG. 7, a torque converter generally comprises a bowl-like input housing 1 which is connected to a flywheel (not shown) of an engine. An outer peripheral end portion 2 of the housing 1 is welded to an outer peripheral end portion 5 of a shell 4 of a pump impeller 3. The input housing 1 and the shell 4 form an outer wall of the torque converter, in which a turbine runner 6, a stator 7 and a lock-up clutch 8 are disposed.

In the known structure, the shell 4 is provided at the end portion 5 with an outer peripheral surface 10 having a small diameter and an axial length L. This outer peripheral surface 10 is fitted into an inner peripheral surface 11 formed at the end portion 2 of the housing 1, and the free end of the end portion 2 and the base end of the surface 11 is welded together, as indicated at 12.

However, in the structure in FIG. 7, the outer peripheral surface 10 is of merely cylindrical shape, and a space 13 extending in the axial direction (right to left in FIG. 7) is formed between the outer surface 10 and the inner surface 11. In the welding process, spatter generated at the portion 12 may pass through the space 13 into the internal space in the torque converter. The spatter in the internal space causes wear or abrasion of a friction facing of the lock-up clutch 8, resulting in short durability thereof. Further, wear powder generated from the facing may enter into an automatic transmission disposed subsequent to the torque converter, which causes choke or clog of a filter in a hydraulic line of a hydraulic pump, which is a control power source of the torque converter.

Of course, the entry of the spatter can be prevented by eliminating the space between the outer and inner surfaces 10 and 11. However, in such a structure, thermal strain resulting from the welding causes deviation or error in the axial positions of internal parts and members. Therefore, it is essential to form the space 13 having an appropriate radial length, e.g., of 0.4 mm–0.5 mm, between the surface portions 10 and 11.

SUMMARY OF THE INVENTION

According to the invention, an outer wall structure of a torque converter includes an input housing having an end portion, and a pump impeller shell having an end portion fixed to the end portion of the input housing, and is characterized in that one of the end portions is provided at the outer peripheral surface with a surface portion of a relatively small diameter, which continues to a free end of its end portion, and a surface portion of a relatively large diameter, which continues to the surface portion of the relatively smal diameter, the other of the end portions is provided at the inner surface with surface portions fitted to the surface portions of the relatively small and large diameter portions, a space for accumulating spatter therein is formed between the inner peripheral surface and said surface portion of said relative small diameter, and both of the end portions are fixed together by a weld portion form at and in the vicinity of the end of the other of the end portions.

In the preferred embodiment, a first annular stepped portion is formed between the outer peripheral surface portions of the relatively small and large diameters, the other end portion is provided at the inner peripheral surface with a surface portion of a relatively large diameter, which is fitted to the outer peripheral surface portion of the relatively large diameter with a second space therebetween, a surface portion of a relatively small diameter, which is fitted to the outer peripheral surface portion of the relatively small diameter with a first space therebetween, and an annular intermediate stepped portion formed between the inner peripheral surface portions of the relatively small and large diameters, and the space for accumulating the spatter is formed between the first stepped portion and the intermediate stepped portion.

According to this structure, in the welding process, the spatter entered into the second space flows through the second space into the intermediate space and is accumulated or captured therein.

More specifically, since the second space, the intermediate space for accumulating the spatter and the first space form meandering pass, the spatter is effectively prevented from flowing into the first space from the second space.

Further, since the spatter flowed from the second space into the intermediate space collide against the intermediate stepped portion, the inertial energy thereof is lost, which also prevents the entry of the spatter into the first space.

Further, the spatter collided against the intermediate stepped portion and staying there is cooled and solidify to glow into such sizes that the solidified spatter can prevent the entry of the subsequent spatter into the first space.

In another embodiment, the outer peripheral surface portion of the relatively small diameter of the one of the end portions is formed by a tapered surface diverging toward the free end thereof, the inner peripheral surface of the other end portion is provided with a tapered inner peripheral surface portion inclined oppositely to the tapered surface, the tapered inner peripheral surface portion is projected oppositely to the space for accumulating the spatter beyond the free end of the tapered outer peripheral surface portion, and a space is formed between the tapered outer peripheral surface portion and the tapered inner peripheral surface portion for passing the spatter therethrough toward the space for accumulating the spatter.

According to this structure, the spatter can enter from the welding area into the internal space in the torque converter. Also, cut powder resulting from machining before assembly and welding may remain in the torque converter. Further, in an initial operation or use of the torque converter, wear powder may be produced from the parts in the torque converter by the spatter and cut powder. These spatter and other foreign powder are dispersed in the torque converter before and immediately after the start of the torque converter. However, they are soon forced and collected to the outer peripheral area in torque converter by the centrifugal force, and then, are moved along the tapered inner peripheral surface into the space for accumulating the spatter. The spatter and the others accumulated as described above remain there due to the function of the tapered outer peripheral surface even during the stoppage of the torque converter and will not escape therefrom.

BRIEF DESCRIPTION OF THE DRAWINGS

FIG. 1 is a schematic sectional view of an embodiment of the invention;

FIGS. 2-6 are schematic sectional views of different embodiments, respectively; and FIG. 7 is a schematic sectional view of a know structure.

DESCRIPTION OF THE PREFERRED EMBODIMENTS

Referring to FIG. 1, parts and members corresponding to those in FIG. 7 bear same reference numerals, and detailed description thereof is omitted.

An end portion 5 of a pump shell 4 is provided at the outer peripheral surface with a surface portion 15 of a smaller diameter 16 and a surface portion of a larger diameter. The smaller portion 15 is positioned at the free end side of the pump shell 4 and the larger portion 16 is positioned at the side of the weld portion 12. An annular first stepped portion 17 is formed between the smaller and larger portions 15 and 16. An edge of the larger portion 16 adjacent to the weld portion 12 continues to an outer surface of the pump shell 4 having a further larger diameter with an annular second stepped portion 18 therebetween.

An input housing 1 (i.e., front cover) is provided at the inner peripheral surface of the end portion with a surface portion 20 of a larger diameter and a surface portion 21 of a smaller diameter. The larger portion 20 is positioned adjacent to the weld portion 12 and the smaller portion 21 is positioned remote from the weld portion 12. An annular intermediate stepped portion 22 is formed between the larger and smaller portions 20 and 21. An end of the smaller portion 21 remote from the intermediate stepped portion 22 continues to an inner peripheral surface of a further smaller diameter of the input housing 1 through an annular stepped portion 23.

The smaller portions 15 and 21 are fitted together with an annular first space 25 therebetween. The larger portion 16 and 20 are fitted together with an annular second space 27 therebetween. An axial space (i.e., intermediate space) is formed between the first stepped portion 17 and the intermediate stepped portion 22. The radial sizes of the first and second spaces 25 and 26 are similar to those in the conventional structure, e.g., of 0.05 mm-0.4 mm.

In the structure described above, the spatter generated in the welding process at the weld portion 12 flows, as described before, from the second space 26 into the space 27 and stays there without entering into the internal space of the torque converter.

In the embodiment in FIG. 1, the smaller and larger surface portions 15 and 16 as well as the larger and smaller surface portions 20 and 21 are formed by straight cylindrical surfaces having constant diameters, respectively. However, those portions may be formed by tapered surfaces, as illustrated in FIG. 2.

An annular surface of the intermediate stepped portion 22 may be inclined, as illustrated in FIG. 3, so that acute angles may be formed between an annular surface of the stepped portion 22 and the surface portion 21 and between the annular surface and the surface portion 20, respectively. In this structure, the spatter can be collected further effectively.

The structure including the inclined intermediate stepped portion 22 as illustrated in FIG. 3 and the structure including the tapered surface portions 15 and 21 may be combined together to form the structures as illustrated in FIG. 4.

The principles in FIGS. 1-3 may be employed in a structure in which the inner peripheral surface of the end portion of the pump shell is fitted around the outer peripheral surface of the end portion of the input housing.

The present invention may further be modified as follows.

Referring to FIG. 5, the outer peripheral surface of the end of the impeller shell 4 is provided with a surface portion 16 of a larger diameter and a stepped portion 17, which are similar to those in FIG. 1, as well as a tapered surface portion 32 of a smaller diameter positioned at the free end side, which is different from that in FIG. 1. This tapered surface portion 32 diverges toward the free end 33. The end portion of the input housing 1 is provided at the inner peripheral surface with a portion 36 of a larger diameter extending up to the free end of the housing 1, and a tapered inner peripheral surface portion 37 which continues to an end of the portion 36 opposite to the weld portion 12. The tapered surface portion 37 converges oppositely toward the weld portion 12.

The larger portion 16 of the impeller shell 4 and a larger portion 36 of the input housing 1 are fitted together with an annular space 26 therebetween. The radial size of this space 26 is similar to those in the conventional structure, e.g., of 0.5 mm-0.4 mm.

The surface portions 36 and 37 are partially positioned radially outside the tapered surface portion 32, and a radial space 27 for collecting the spatter is formed. The tapered surface portion 37 partially projects beyond the end 33 of the impeller 4, and a space 40, through which the spatter passes, is formed between the end 33 and the surface portion 37. The radial size of the space 40 is determined at a substantially minimum value which permits the passage of the spatter, cut or machined powder and wear powder therethrough.

According to the above structure, as detailed before, the foreign powder in the torque converter is moved radially outwardly by the centrifugal force caused by the operation of the torque converter, and is guided along the tapered surface 37 into the space 27. The space collected in the space 27 is restricted or prevented from moving toward the space 40 by the tapered surface portion 32. Therefore, even when the torque converter stops, they remains in the space 27.

The principle of the structure in FIG. 5 may be applied to a structure in which the inner peripheral surface of the end portion of the impeller shell 4 is fitted around the outer peripheral surface of the end portion of the housing 1, as illustrated in FIG. 6.

The tapered surface 32 may have a curvedly concave section.

INDUSTRIAL APPLICABILITY

As described hereinbefore, according to the invention, the spatter can be effectively prevented from entering the internal space of the torque converter, or, the spatter, cut powder and wear powder in the torque converter can be effectively collected. Accordingly, it is possible to prevent the wear of the friction facing or lining and the clog of a filter, resulting in a long durability. Thus, the present invention can be effectively applied to the torque converters and other fluid couplings.

What is claimed is:

1. An outer wall structure of a torque converter including an input housing having an end portion, and a pump impeller shell having an end portion fixed to said end portion of the input housing, characterized in that one of said end portions is provided at the outer peripheral surface with a surface portion of a relatively small diameter, which continues to a free end of its end portion, and a surface portion of a relatively large diameter, which continues to said surface portion of the relatively small diameter, the other of said end portions is provided at the inner surface with surface portions fitted to said surface portions of said relatively small and large diameter portions, a space for accumulating spatter and cut powder therein is formed between said inner peripheral surface and said surface portion of said relative small diameter, said space opening into said housing at said one of said end portions and both of said end portions are fixed together by a weld portion formed at and in the vicinity of the end of said other of the end portions.

2. An outer wall structure of claim 1 wherein a first annular stepped portion is formed between said outer peripheral surface portions of the relatively small and large diameters, said other end portion is provided at said inner peripheral surface with a surface portion of a relatively large diameter, which is fitted to said outer peripheral surface portion of the relatively large diameter with a second surface therebetween, a surface portion of a relatively small diameter, which is fitted to said outer peripheral surface portion of the relatively small diameter with a first space therebetween, and an annular intermediate stepped portion formed between said inner peripheral surface portions of the relatively small and large diameters, and said space for accumulating the spatter is formed between said first stepped portion and said intermediate stepped portion.

3. An outer wall structure of claim 1 wherein said outer peripheral surface portion of said relatively small diameter of said one of said end portions is formed by a tapered surface diverging toward the free end thereof, said inner peripheral surface of said other end portion is provided with a tapered inner peripheral surface portion inclined oppositely to said tapered surface, said tapered inner peripheral surface portion is projected oppositely to said space for accumulating the spatter beyond the free end of said tapered outer peripheral surface portion, and a space is formed between said tapered outer peripheral surface portion and said tapered inner peripheral surface portion for passing the spatter therethrough toward said space for accumulating the spatter.

* * * * *